(12) United States Patent
Jebutu et al.

(10) Patent No.: US 9,746,576 B2
(45) Date of Patent: Aug. 29, 2017

(54) WETTABILITY ESTIMATION USING MAGNETIC RESONANCE

(71) Applicants: Segun A. Jebutu, Richmond, TX (US); Weidong Li, Bellaire, TX (US)

(72) Inventors: Segun A. Jebutu, Richmond, TX (US); Weidong Li, Bellaire, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 600 days.

(21) Appl. No.: 14/287,834

(22) Filed: May 27, 2014

(65) Prior Publication Data
US 2015/0346377 A1 Dec. 3, 2015

(51) Int. Cl.
*G01V 3/00* (2006.01)
*G01V 3/32* (2006.01)
*E21B 49/00* (2006.01)

(52) U.S. Cl.
CPC ............ *G01V 3/32* (2013.01); *E21B 49/00* (2013.01)

(58) Field of Classification Search
CPC .......... G01V 3/32; G01V 3/38; G01N 24/081; G01R 33/448; G01R 33/3808
USPC ....................................................... 324/303
See application file for complete search history.

(56) References Cited

U.S. PATENT DOCUMENTS

| | | | |
|---|---|---|---|
| 6,366,087 B1 | 4/2002 | Coates et al. | |
| 6,765,380 B2 | 7/2004 | Freedman et al. | |
| 6,950,750 B1 * | 9/2005 | Carpentier | E21B 49/08 436/31 |
| 8,362,767 B2 | 1/2013 | Hurlimann et al. | |
| 2002/0167314 A1 * | 11/2002 | Prammer | G01V 3/32 324/303 |
| 2005/0030021 A1 * | 2/2005 | Prammer | G01V 3/32 324/303 |
| 2007/0244648 A1 * | 10/2007 | Chen | G01N 24/081 702/11 |
| 2012/0241149 A1 * | 9/2012 | Chen | G01V 3/32 166/250.01 |
| 2013/0057277 A1 * | 3/2013 | Zielinski | G01V 3/32 324/303 |

(Continued)

FOREIGN PATENT DOCUMENTS

| | | |
|---|---|---|
| CN | 1272640 C | 8/2006 |
| EP | 2341372 A1 | 7/2011 |

OTHER PUBLICATIONS

Moss, A.K. et al., "Resistivity Index and Capillary Pressure Characteristics of Reservoir Sandstones in Different Wettability Conditions", Center for Petroleum Studies, TH Huxley School of Environment, Earth Sciences and Engineering Imperial College.1pp.

(Continued)

*Primary Examiner* — Walter L Lindsay, Jr.
*Assistant Examiner* — Frederick Wenderoth
(74) *Attorney, Agent, or Firm* — Cantor Colburn LLP

(57) ABSTRACT

A method of estimating a wettability characteristic of a formation includes: disposing a magnetic resonance (MR) measurement apparatus in a borehole; generating a low gradient static magnetic field and an oscillating magnetic field in a region of the formation; detecting a MR signal generated in the region; calculating relaxation parameters for at least one fluid in the region; and estimating the wettability characteristic of the region based on the relaxation parameters.

18 Claims, 3 Drawing Sheets

(56) References Cited

U.S. PATENT DOCUMENTS

2013/0325348 A1  12/2013  Valori et al.
2014/0325348 A1*  10/2014  Goktekin ............. G06T 3/0056
                                                              715/249

OTHER PUBLICATIONS

S.M. Skjaeveland,., et.al.,(2000) "Capillary Pressure Correlation for Mixed-wet Reservoirs" SPE 59314. SPE Reservoir Evaluation & Eng. vol. 3 2000, 2000 SPE/DOE Improved Oil Recovery Symposium held in Tulsa, Oklahoma, Apr. 3-5, 2000. 13 pages.

Toumelin, E. et al., "Reconciling NMR Measurements and Numerical Simulations: Assessment of Temperature and Diffusive Coupling Effects on Two-Phase Carbonate Samples", Petrophysics, vol. 44, No. 2 (Mar.-Apr. 2003); p. 91, 17 figures, 4 tables.

Toumelin, et al., "Balancing Lithology and Low-Pressure Hydrocarbon Effects: Evaluation of Low-Pressure Reservoirs Utilizing Magnetic Resonance in the Alaska Cook Inlet", 2009 SPE Annual Technical Conference and Exhibition held in New Orleans, Louisiana.

Turco et al., "Permeability and Saturation Evaluation in Deep Water Turbidite Utilizing Logging-While-Drilling Low Gradient Magnetic Resonance", 2007 SPE Annual Technical Conference and exhibition, Anaheim, California, Nov. 11-14, 1997, 8 pages.

Volokitin, et al., "A Practical Approach to Obtain 1st Drainage Capillary Pressure Curves from NMR Core and Log Data", SCA-9924, 1999, 12 pages.

Wardlaw, "The effects of geometry, wettability, viscosity and interfacial tension on trapping in single pore-throat pairs", Technology, May-Jun. 1982, Montreal, pp. 21-27.

Zhang et al., "Interpretation of Wettability in Sandstones With NMR Analysis", Petrophysics, vol. 41, No. 3. (May-Jun. 2000); p. 223-233, 17 figures.

Zhou et.al. "Characterization of Wettability from Spontaneous Imbibition Measurements", Journal of Canadian Petroleum Technology 1999 Special Edition, vol. 38, No. 13, 8 pages.

Amott, Earl, "Observations Relating to the Wettability of Porous Rock", SPE 1167, American Institute of Mining, Metallurgical 7 Petroleum Engineers, vol. 216, 1959, SPE 1167-G, 7 pages.

Bobek, J.E., et al., "Reservoir Rock Wettability—Its Significance and Evaluation" American Institute of Mining, Metallurgical & Petroleum Engineers, vol. 213, 1958, SPE 895-G, 6 pages.

Borneman et al., "Application of optimal control to CPMG refocusing pulse design", Journal of Magenetic Resonance 207 (2010) pp. 220-233.

Denekas, M.O., Mattax, C.C., and Davis, G.T., (1959), "Effect of Crude Oil Components on Rock Wettability", JPT pp. 330-333, Nov. 1959.

Fleury, et al., "Positive Imbibition Capillary Pressure Curves Using the Centrifuge Technique", SPE 1999, 11 pages.

Jadhunandan, et al., "Effect of Wettability on Waterflood Recovery for Cude-Oil/Brine/Rock Systems", SPE 22597, SPE Reservoir Engineering, Feb. 1995, pp. 40-46.

Jadhunandan, P.P., and Morrow, N.R, (1991), "Spontaneous Imbibition of Water by Crude Oil/Brine/Rock systems-Insitu" v.15 No. 4., pp. 319-345,1991.

Jebutu, et al., "In-situ Wettability Utilizing Low Gradient Magnetic Resonance", SPE-170652-MS, SPE Annual Technical Conference and Exhibition, Amsterdam, The Netherlands, Oct. 27-29, 2014, 11 pages.

Kjosavik, et al., "Releative Permeability Correlation for Mixed-Wet Reservoirs", SPE 59314, 2000 SPE/DOE IMproved Oil Recovery Symposium held in Tulsa, Oklahoma, Apr. 3-5, 2000, 13 pages.

Kleinberg, et al., "Nuclear Magnetic Resonance of Rocks: t1 vs. T2", SPE 26470, 68th Annual Technical Conference and Exhibition of the Society of Petroleum Engineers held in Houston, TExas, Oct. 3-3, 1993, pp. 555-563.

Lo, et al., "Correlations of NMR Relaxation Time with Viscosity, Diffusivity, and Gas/Oil Ratio of Methane/Hydrocarbon Mixtures" , 2000 SPE Annual Technical Conference andExhibition held in Dallas, Texas, Oct. 1-4, 2000, 15 pages.

Lo, S.w., Hirasaki, G.J., House, W.V., and Kobayashi R., (2000), "Correlations of NMR Relaxation Time with Viscosity, Diffusivity, and Gas/Oil Ratio of Methane/Hydrocarbon Mixtures", Paper SPE 6321, SPE 2000 ATCE, Dallas, Texas, Oct. 1-4 , 15 pages.

Looyestijn et al., "Wettability Index Determination by Nuclear Magnetic Resonance", SPE 93624 14th SPE Middle East Oil & Gas Show and Conference held in Bahrain International Exhibition Centre, Bahrain, Mar. 12-15, 2005, 8 pages.

Looyestijn, "Wettability Index Determination from NMR Logs", Petrophysics, vol. 49, No. 2 (Apr. 2008), p. 130-145, 19 figures.

Looyestijn, et al. "Wettability Index Determination from NMR logs", Petrophysics SPWLA 48th Annual Logging Symposium, Jun. 3-6, 2007, 16 pages.

Mahammadlou, "Complexitiy of Wettability Analysis in Heterogeneous Carbonate Rocks, A Case Study", SPE 154402, EAGE Annual Conference & Exhibition incorporating SPE Europec held in Copenhagen, Denmark, Jun. 4-7, 2012, 13 pages.

Moore, et al., Displacement of Oil by Water-Effect of Wettability, Rate, and Viscosity on Recovery, 30th Annual Fall Meeting of the Petroleum Branch of the Ameircan Institute of Mining and Metallurgical Engineers, New Orleans, Oct. 2-5, 1955, 16 page.

Morrow, Norman R., "Wettability and Its Effect on Oil Recovery", Society of Petroleum Engineers, Dec. 1990, pp. 1476-1484.

Notification of Transmittal of the Internatinal Search Report and the Written Opinion of the International Searching Authority, or the Declaration; PCT/US15/031109; Mailing Date Aug. 21, 2015, 13 pages.

* cited by examiner

WETTABILITY ESTIMATION USING MAGNETIC RESONANCE

BACKGROUND

Understanding the characteristics of geologic formations and fluids located therein is important for effective hydrocarbon exploration and production. For example, accurate estimation of the wetting characteristics of in-situ reservoir fluids is critical for evaluation of hydrocarbon recovery, selection of production mechanisms and understanding of field development economics.

Magnetic resonance tools can be used to estimate characteristics of formations, such as permeability and fluid characteristics. Such tools can be conveyed into a borehole during drilling (e.g., as logging-while-drilling tools) or after drilling (e.g., as wireline tools). Characterization of the formations and the fluids within provides valuable information related to the intended use of the formation so that drilling and production resources can be used efficiently.

SUMMARY

A method of estimating a wettability characteristic of a formation includes: disposing a magnetic resonance (MR) measurement apparatus in a borehole; generating a low gradient static magnetic field and an oscillating magnetic field in a region of the formation; detecting a MR signal generated in the region; calculating relaxation parameters for at least one fluid in the region; and estimating the wettability characteristic of the region based on the relaxation parameters.

An apparatus for estimating a wettability characteristic of a formation includes: a magnetic resonance (MR) tool configured to be disposed in a borehole in the formation, the magnetic resonance tool configured to generate a low gradient static magnetic field and an oscillating magnetic field in a region of the formation and detect a MR signal generated in the region; and a processor configured to calculating relaxation parameters for at least one fluid in the region and estimate the wettability characteristic of the region based on the relaxation parameters.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Apparatuses and methods for characterizing subterranean formations are described herein. An embodiment of a method includes measuring magnetic resonance (MR) in a formation using a low gradient magnetic resonance device, such as a low gradient nuclear magnetic resonance (NMR) tool. In one embodiment, the device is a logging-while-drilling (LWD) device configured to take MR measurements at a series of depths or regions of a formation. The method includes analyzing the measurements at each depth to determine $T_2$ relaxation values for fluids disposed in the formation, such as oil and water fluids. "Oil" refers to any type of liquid hydrocarbon, and "water" refers to liquids primarily consisting of water, such as substantially pure water and brine. Relaxation time shifts relative to bulk relaxation times for a fluid are quantified to estimate wettability characteristics of the formation. In one embodiment, a wettability index map or profile is generated for the formation. The wettability characteristics may be evaluated in conjunction with various other data to generate models and other evaluations of the formation.

Figure 1:
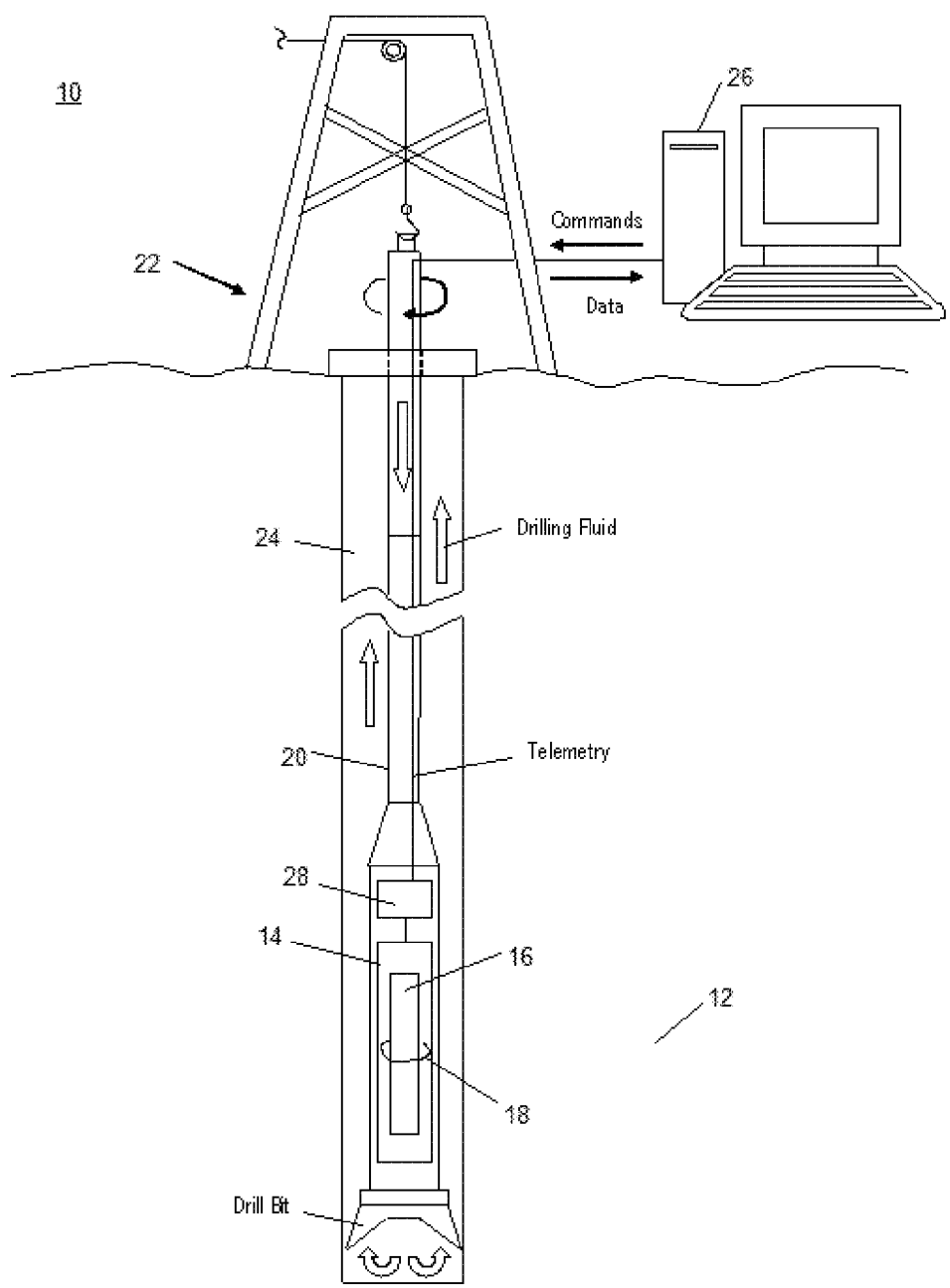
FIG. 1 is a perspective view of an exemplary embodiment of a nuclear magnetic resonance (NMR) measurement apparatus.

FIG. 1 illustrates an exemplary embodiment of a downhole measurement, data acquisition and/or analysis system 10 that includes devices or systems for in-situ measurement of characteristics of an earth formation 12. The system 10 includes a magnetic resonance tool 14 such as a nuclear magnetic resonance (NMR) tool. An example of the magnetic resonance tool is a LWD magnetic resonance tool such as the MagTrak™ LWD tool by Baker Hughes, Inc. The tool 14 is configured to generate magnetic resonance data for use in estimating characteristics including wettability characteristics of the formation. Wettability refers to the preference of a solid (e.g., rock components) to contact one fluid over another. As described herein, a "fluid" refers to a liquid, gas, or a combination thereof. In one embodiment, the fluid is primarily oil and/or water in the formation. Other characteristics that can be estimated using the tool 14 include porosity and permeability.

An exemplary tool 14 includes a static magnetic field source 16 that magnetizes formation materials and an antenna 18 that transmits radio-frequency energy or other oscillating or pulsed energy that provides an oscillating magnetic field. The antenna may also serve as a receiver. It can be appreciated that the tool 14 may include a variety of components and configurations as known in the art of magnetic resonance and/or NMR.

The tool 14 may be configured as a component of various subterranean systems, such as well logging and logging-while-drilling (LWD) systems. For example, the tool 14 can be incorporated with a drill string 20 or other suitable carrier and deployed downhole, e.g., from a drilling rig 22 into a borehole 24 during a drilling operation. The tool 14 is not limited to the embodiments described herein, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

In one embodiment, the tool 14 and/or other downhole components are equipped with transmission equipment to communicate ultimately to a surface processing unit 26. Such transmission equipment may take any desired form, and different transmission media and methods may be used, such as wired, fiber optic, and wireless transmission methods. Additional processing units may be disposed with the carrier. For example, a downhole electronics unit 28 includes various electronic components to facilitate receiving signals and data, transmitting data, and/or processing data downhole. The surface processing unit 26, the tool 14 and/or other components of the system 10 include devices as necessary to provide for storing and/or processing data collected from the tool 14 and other components of the system 10. Exemplary devices include, without limitation, at least one processor, storage, memory, input devices, output devices and the like.

The system 10 is used to estimate wetting characteristics of the formation using magnetic resonance data such as NMR logs. The term "wetting" relates to the contact between a solid (e.g., rock) and a liquid (e.g., oil or water) resulting from intermolecular interactions when the solid and the liquid are brought together. These characteristics include formation wettability and identification of regions of single and mixed wetting. In one embodiment, the magnetic resonance data is generating by measuring in-situ magnetic resonance in a low gradient field, i.e., performing low gradient magnetic resonance measurements.

Embodiments described herein enable direct wettability estimation at in-situ reservoir conditions by acquiring low gradient magnetic resonance measurements. Wettability is difficult to measure in-situ, however the interaction of molecular fluid surfaces and rock mineral surfaces have an apparent relaxation time that is influenced by the surface relaxation mechanism of magnetic resonance. Wettability can be measured in the laboratory through contact angle, atomic forces microscope imaging and Amott index measurements, however these measurements are scale-constrained and difficult to reconstruct original down-hole conditions. Embodiments described herein that allow for in-situ wettability estimations thus have significant advantages.

In one embodiment, magnetic resonance measurements are performed by a gradient magnetic resonance tool, which generates a uniform static magnetic field ($B_0$) in a volume of the formation using one or more magnets (e.g., the magnetic field source 16). An oscillating (e.g., RF) magnetic field ($B_1$), which is at least substantially perpendicular to the static magnetic field, is generated in the volume. A magnetic field gradient (G), produced by one or more gradient coils, is also generated in the volume. The magnetic field gradient may be fixed or pulsed.

A receiver detects magnetic resonance (MR) signals generated by Hydrogen protons in the formation fluid. These signals include a series of spin echoes (spin echo train), which are detected by the tool and can be displayed on MR logs. The amplitude of these spin echoes is detected as a function of time, allowing for detection of both amplitudes and the decay of these signals.

When an assembly of magnetic moments, such as those of hydrogen nuclei, are exposed to a static magnetic field, they tend to align along the direction of the magnetic field, resulting in bulk magnetization. The rate at which equilibrium is established in such bulk magnetization upon provision of a static magnetic field is characterized by the parameter $T_1$, also referred to as the spin-lattice relaxation time. Another parameter is the spin-spin relaxation time $T_2$, also referred to as the transverse relaxation time, which is related to the relaxation due to non-homogeneities in the local magnetic field over the sensing volume of the tool. The $T_2$ relaxation time constant that is estimated via MR measurements is referred to as the apparent transverse relaxation time constant $T_2$. Another measurement parameter is the formation diffusion D, which is related to the motion of atoms in a gaseous or liquid state due to their thermal energy.

In a gradient magnetic field, diffusion affects the MR data and $T_2$ relaxation data by contributing to a faster rate of relaxation.

The fundamental parameters of apparent $T_2$ relaxation are expressed as a summation of three contributing components. These components are surface relaxivity, bulk relaxivity, and molecular spin-dephasing diffusion terms ($T_{2Diffusion}$). The $T_2$ surface relaxivity (R) is related to the $T_2$ surface relaxation time ($T_{2surface}$), and the bulk relaxivity is related to the T2 bulk relaxation time ($T_{2bulk}$). Thus, the apparent $T_2$ relaxation can be expressed as:

$$1/T_{2apparent} = 1/T_{2surface} + 1/T_{2bulk} + 1/T_{2Diffusion}.$$

This expression assumes the various spin-echo mechanisms are interdependent, but in reality they are coupled in the apparent signal measured. The $T_2$ relaxation time for a fluid such as water or oil in a reservoir depends on the wettability characteristics of the reservoir. If a fluid is not in contact with a solid surface, the relaxation time of the fluid is related to the fluid's $T_2$ bulk relaxation time. However, if a fluid is in contact with a solid surface (e.g., the surface of a pore), the $T_2$ surface relaxation time dominates.

Figure 2:
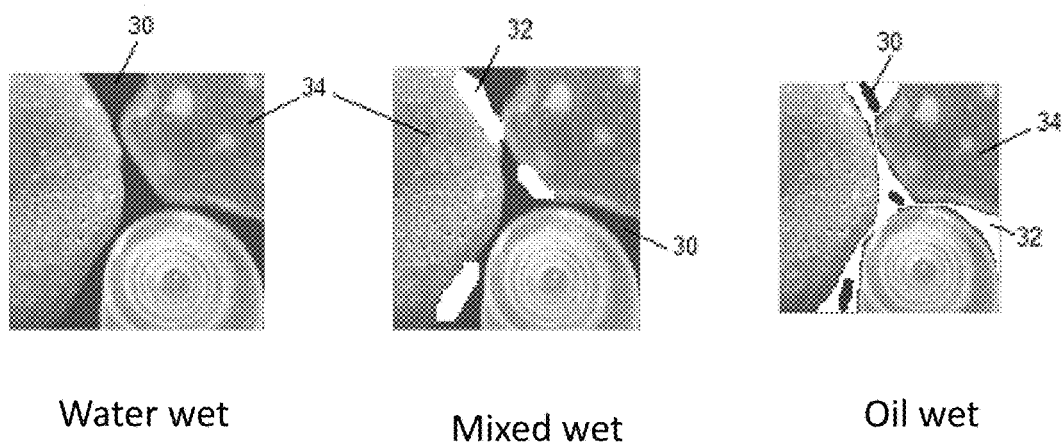
FIG. 2 depicts fluids in exemplary formations having different wettability characteristics.

FIGS. 2A-C show examples of formations having different wettability characteristics. In these examples, water 30 and oil 32 are present in pores formed by rock grains 34. In a water-wet formation (FIG. 2A), water is referred to as the wetting phase, and the oil (also referred to as the oil phase) has no contact with the pore surfaces. In an oil-wet formation (FIG. 2C), the oil is the wetting phase, and the water (also referred to as the water phase) has no contact with the pore surfaces. In a mixed-wet formation (FIG. 2B), however, both the water and the oil have some contact with the pore surfaces.

In a water-wet reservoir, the $T_2$ bulk relaxation is the dominant signal in the apparent $T_2$ of the oil phase, while for the wetting phase (water in this case), the dominant signal in the apparent $T_2$ is the $T_2$ surface relaxation. When gas is the non-wetting fluid, the dominant signal in the apparent $T_2$ is the diffusion term. In an oil-wet reservoir, the $T_2$ bulk relaxation is dominant in the water phase, and the $T_2$ surface relaxation is dominant in the oil phase.

For the apparent $T_1$ of formation fluids, the diffusion term is excluded and the apparent $T_1$ relationship is expressed as:

$$1/T_{1apparent} = 1/T_{1surface} + 1/T_{1bulk}.$$

In one embodiment, the magnetic resonance measurements are performed by a low gradient magnetic resonance tool. The tool generates a static magnetic field that has a gradient that is sufficiently low so that the apparent $T_1$ is approximately equal to the apparent $T_2$. Such low gradient fields are much less sensitive to the molecular diffusion than typical high gradient fields. An exemplary static magnetic field for a low gradient tool is less than or equal to about 2 G/cm (Gauss per centimeter) or 0.02 T/m (Tesla per meter). Thus, for low gradient magnetic resonance:

$$1/T_{1apparent} = 1/T_{2apparent}.$$

In a water-wet reservoir, the $T_1$ or $T_2$ of the wetting phase (water or brine) is dominantly from the surface relaxation term given by:

$$T_{1surface} = T_{2surface} = (R*S/Vp)^{-1},$$

where "S/Vp" is the surface to volume ratio of the rock pore and "R" is the transverse surface relaxivity. The $T_1$ or $T_2$ of the oil phase is dominantly from the bulk relaxation term given by:

$$T_{1bulk} = T_{2bulk} = 1.2*T/(298*n),$$

where "T" is temperature and "n" is viscosity.

However, in mixed-wet reservoirs, the oil and water phases each relax though a combination of bulk relaxation and surface relaxation, and depend on the ratio of water-wet surface area to water volume and oil-wet surface area to oil volume. Thus, the oil relaxation spectra given by the $T_2$ of the oil phase will shift relative to the bulk spectrum due to an enhanced surface relaxivity of the oil.

For a water-wet reservoir, the $T_2$ relaxation spectrum for the oil phase will correspond to, or at least be primarily due to, the $T_{2bulk}$ spectrum. However, if the measured $T_2$ spectrum for oil is shifted relative to the $T_{2bulk}$ spectrum for oil toward shorter relaxation times, this is an indication that the reservoir is mixed-wet. This shift can be used to determine the wettability of the reservoir, i.e., whether the reservoir is oil-wet, water-wet, or mixed-wet. The wettability can be quantified by a wettability index that indicates the fraction of the pore surface that is wet by oil and the fraction that is wet by water. Although water and oil are discussed herein as pore fluids, the embodiments described herein are not limited thereto. The embodiments described herein can be used in conjunction with formations containing other fluids having varying viscosities or densities.

Figure 3:
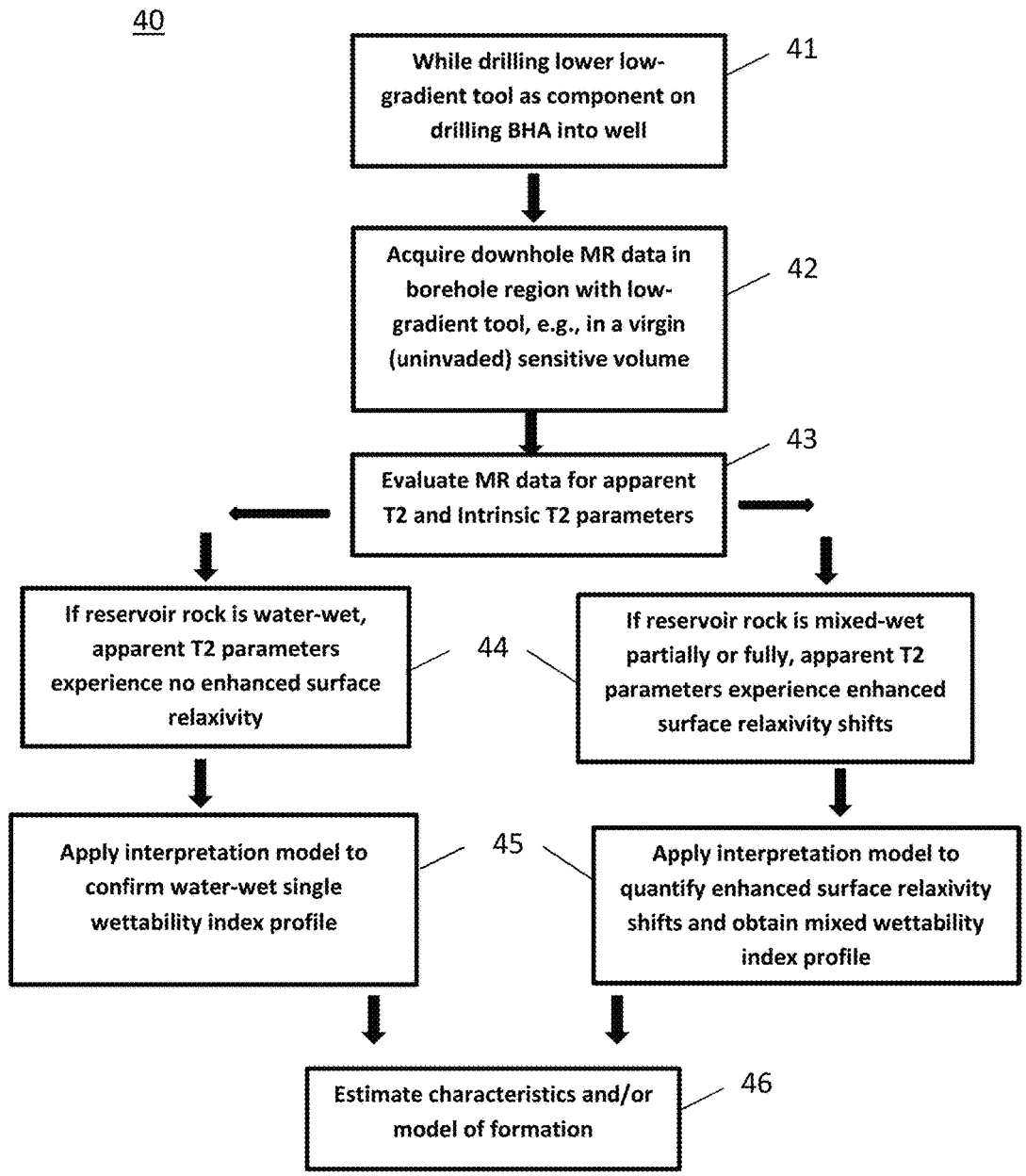
FIG. 3 is a flow chart providing an exemplary method of generating magnetic resonance measurements and estimating wettability characteristics of a formation.

FIG. 3 illustrates a method 40 of estimating characteristics of an earth formation, including wettability characteristics. The method 40 may be performed in conjunction with the system 10 and/or the tool 14, but is not limited thereto. The method 40 includes one or more stages 41-46. In one embodiment, the method 40 includes the execution of all of the stages 41-46 in the order described. However, certain stages may be omitted, stages may be added, or the order of the stages changed.

In the first stage 41, a NMR or other magnetic resonance measurement tool is disposed in a borehole. In one embodiment, the tool (e.g., the tool 14) is disposed during drilling as part of a LWD operation. The method is not limited to LWD operations, as the tool may be disposed in any suitable carrier, such as a wireline tool.

In the second stage 42, low gradient MR data, such as low gradient NMR data, is acquired. As the tool is lowered during drilling, a low gradient static magnetic field $B_0$ is generated in the surrounding formation volume, and a radio frequency (RF) or other pulsed signal is transmitted into at least one transmitting antenna, which in turn generates an oscillating magnetic field $B_1$ in the volume. At least one receiving antenna detects MR signals from the volume in response to the interaction between the nuclear spins of interest and the static and oscillating magnetic fields, and generates raw MR data. The raw MR data includes spin echo trains measured at a plurality of depths. MR data is generated at multiple depths, during which the tool may be moving or stationary. In one embodiment, data as generated at a sufficient number of depths so that a continuous or near-continuous NMR or MR log can be generated.

In the third stage 43, the MR data is analyzed to estimate relaxation time parameters. In one embodiment, the spin echo data is converted to $T_2$ relaxation times. $T_2$ distributions or spectra for multiple fluid phases, such as oil and water phases, are calculated. Any suitable inversion or other process may be utilized to calculate the $T_2$ spectra. In one embodiment, the reservoir primarily includes one or more types of oil (referred to collectively as "oil"), and water (or brine). In this embodiment, $T_2$ distributions or spectra are calculated for both the oil and for water phases.

In addition, apparent T2 distributions for wetting and/or non-wetting phases are calculated. These distributions can be obtained from core or fluid samples of the reservoir or other data, e.g., derived from previous downhole or surface measurements. The apparent $T_2$ distributions are calculated assuming the formation has a single wetting phase. For example, the formation is assumed to be only water-wet, and the apparent $T_2$ distribution of oil (assumed to be the non-wetting phase) is calculated. The apparent $T_2$ distribution of the non-wetting phase is assumed to be dominated by the bulk $T_2$ distribution of the non-wetting phase.

In the fourth stage 44, for each set of NMR data (at each depth), it is determined whether the formation is single-wet (i.e., wet by only one fluid) or mixed-wet. Once this determination is made, regions of single-wet and mixed-wet regions of the formation can be identified, e.g., by creating a wettability profile.

Whether the formation is mixed-wet is determined by comparing the measured $T_2$ distribution of the assumed non-wetting phase to the apparent (bulk) $T_2$ distribution of the non-wetting phase. The measured and apparent $T_2$ distributions can be compared using a selected attribute of the distributions. For example, the peak of the each distribution, the center of each distribution, or a statistical attribute such as the mean can be compared.

If the reservoir is single-wet, the measured $T_2$ distribution for the non-wetting phase (i.e., the distribution calculated based on the measured low gradient NMR data) will substantially equal or correspond to the apparent $T_2$ distribution for the non-wetting phase (e.g., the peak or center will occur at the same location or within a selected tolerance). If the reservoir is mixed-wet, the assumed non-wetting phase at least partially contacts the pore surface, and thus the $T_2$ distribution is affected by surface relaxation as well as bulk relaxation. In this case, the measured $T_2$ distribution shifts relative to the apparent $T_2$ distribution, i.e., the measured $T_2$ distribution for the fluid is shorter than the bulk T2 distribution for the fluid.

For example, for a reservoir that includes water and oil, the measured T2 distributions for oil and water are calculated based on MR data for a reservoir region. An apparent $T_2$ distribution for oil is calculated based on the assumption that the reservoir is water-wet. Thus, the apparent $T_2$ is substantially the same as the bulk $T_2$ for oil. The measured $T_2$ distribution for oil is compared to the apparent $T_2$ distribution. If these distributions are substantially the same, the reservoir is determined to be water-wet. If these distributions are different, e.g., the measured $T_2$ distribution is shorter than the apparent $T_2$ distribution, the reservoir is considered to be mixed-wet.

In the fifth stage 45, a wettability index or profile is generated, which indicates the surface contact between pore fluids (e.g., oil and water) and pore surfaces. A wettability index (e.g., profile or map) can be generated based on the degree that a reservoir region is wet by more than one fluid. For example, a wettability index may be generated that has a value of one for a completely water-wet region, a value of zero for a completely oil-wet region, and an intermediate value based on the amount of the $T_2$ distribution shift for the oil phase. The wettability index, in one embodiment, is based on the ratio of the surface relaxivity of a first fluid (e.g., water) to the surface relaxivity of a second fluid (e.g., oil), which is calculated based on the difference between the measured and apparent $T_2$ distributions. It is noted that these values are merely examples, as any suitable values or metrics may be used.

In one example, a JW-wettability index map, (Jebutu_Weidong_Wettability index map), is computed by using a reference zone below the free-water level (FWL), where the capillary pressure between water and oil is zero. A known water-wet hydrocarbon zone can also be used, however having a known zone below the FWL generally gives best results.

Such wettability indexes or profiles can be used to evaluate the potential production performance from mixed-wet systems by describing the connectivity of the wetting phases, which may aid or impair mobility of fluid displacement.

In the sixth stage 46, characteristics of the water-wet and/or mixed-wet regions are estimated using the NMR data. Additional data may be used to facilitate characterizing the formation. For example, data such as core data, core flood experiments, advanced fluid sampling and/or dynamic temperature anomaly evaluations are integrated to investigate the pore-scale complex fluid distributions and connectivity of varying wettability systems.

In one embodiment, the wettability characteristics of the reservoir are integrated into a reservoir model. For example, a reservoir model of grain size, lithology and/or fluid types and volumes can be generated using the wettability characteristics, as well as any other characteristics (e.g., permeability, porosity, fluid composition) derived from MR and/or other data. Additional data can be incorporated in the model from various sources, such as logging data, core data, fluid sample data, core flood experiment data, temperature data, pressure data, and others.

One example of a reservoir model is generated using wettability characteristics to estimate the distribution of fluids in the reservoir, which provides an estimate of the relative volumes of fluids (e.g., oil and water), as well as their distribution. The model can also be used to identify the location and extent of transition zones. An exemplary model incorporates wettability, chemical composition and surface interfacial tension characteristics. The wettability characteristics can be derived from T2 spectra, e.g., using the equations above.

For fluid to move through the pore throat, buoyancy (a fluid property) must exceed the capillary pressure. The following equation shows the relationship between capillary pressure and fluid density:

$$Hd = 2\sigma * \cos\theta / r \Delta\rho * g,$$

where "Hd" is capillary rise height or capillary pressure, "$\sigma$" is the interfacial tension, "$\theta$" is the contact angle, "r" is the inner radius of the capillary (pore or pore throat radius), "$\Delta\rho$" is the density difference between phases (e.g., between oil and water), and "g" is gravitational acceleration.

The above equations for capillary pressure and $T_2$ values are combined to extract the spin-lattice interaction as a surface fluid volume function (SVF_function) which is a function of the wetting fluid properties, chemical composition and interfacial tension:

$$SVF\_function = f(Fluid\ properties, chemical\ composition, surface\ IFT).$$

The fluid properties include properties such as wettability. Chemical composition can be determined, for example, based on NMR chemical shift. The Surface volume function (SVF) is a quantitative measure of the fluid properties and interfacial tension characteristics of the rock-fluid system. The spin-lattice SVF function increases with increasing partial wetness of oil on the rock surface.

The method 40 can be performed as a periodic, near-continuous or continuous logging method. A continuous or near-continuous wettability profile is generated, that can be used to identify regions having different wettability characteristics, and can also be used to generate and update reservoir models. The method 40 can also be performed in real time during a drilling or logging operation.

In one embodiment, the method 40 is performed in virgin uninvaded reservoir regions or conditions. Such regions or conditions can be evaluated, for example, in exploratory or appraisal wells. In this way, the original wettability conditions of a reservoir prior to any wettability alteration from invading filtrates or production can be estimated.

Embodiments described herein have various advantages over prior art apparatuses and techniques. These embodiments provide for accurate and early knowledge of the presence of mixed-wet systems, which can enable optimal development planning of future recovery methods. In addition, the embodiments allow for decoupling of surface and bulk relaxation terms without requiring sampling or laboratory measurements.

Determination of wettability is important for assessing reservoir drainage characteristics, which impact the recovery efficiency of hydrocarbons from porous formations, sandstones or carbonates. Wettability is a key component to determine the efficiency of oil recovery by water displacement in oil reservoirs. Reservoir simulation and management of waterflood recovery methods strongly relies on the accurate understanding of the in-situ wettability conditions of the oil/water/rock reservoir system.

For wettability determination, a major challenge for typical high gradient magnetic resonance applications is how to decouple the surface and bulk relaxation terms when the fluids in the rock are only water and oil. This decoupling becomes more complex in the presence of gas when the diffusion term is included. Such high gradient measurements suffer from disadvantages including the coupling of $T_2$ signals from different phases, as well as coupling of signals due to diffusion. Embodiments described herein address these disadvantages by providing low gradient measurements that are less sensitive to these signal couplings.

In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. A method of estimating a wettability characteristic of a formation, comprising:
    disposing a magnetic resonance (MR) measurement apparatus in a borehole;
    generating a low gradient static magnetic field and an oscillating magnetic field in a region of the formation, the region including at least a first fluid and a second fluid;
    detecting a MR signal generated in the region by a receiving antenna, and calculating a $T_2$ distribution by a processor based on the NMR signal;
    calculating, by the processor, relaxation parameters for at least one fluid in the region based on an assumption that the region is a single-wet region, the relaxation parameters including a first apparent $T_2$ distribution corresponding to a bulk relaxation distribution of the first fluid, and a second apparent $T_2$ distribution corresponding to a bulk relaxation distribution of the second fluid; and
    estimating, by the processor, the wettability characteristic of the region based on the relaxation parameters, wherein estimating the wettability characteristic includes determining whether the region is a single-wet region or a mixed-wet region based on comparing the calculated $T_2$ distribution to at least one of the first apparent $T_2$ distribution and the second apparent $T_2$ distribution.

2. The method of claim 1, wherein the gradient of the low gradient magnetic field is non-zero and sufficiently low so that the $T_1$ distribution is at least substantially the same as the $T_2$ distribution.

3. The method of claim 1, wherein the at least two fluids include oil and water.

4. The method of claim 1, wherein estimating the wettability characteristics includes determining that the region is a single-wet region based on the first apparent $T_2$ distribution and the calculated first $T_2$ distribution being at least substantially the same.

5. The method of claim 4, wherein estimating the wettability characteristics includes determining that the region is a mixed-wet region based on the first apparent $T_2$ distribution and the calculated first $T_2$ distribution being different, the mixed-wet region having a fraction of the second fluid that is in contact with pore surfaces in the region.

6. The method of claim 5, further comprising calculating, by the processor, a wettability index based on the comparison between the first apparent $T_2$ distribution, the second apparent $T_2$ distribution and the calculated $T_2$ distribution.

7. The method of claim 6, wherein the wettability index indicates a ratio of a first fluid surface relaxivity to a second fluid surface relaxivity.

8. The method of claim 6, wherein the method is performed at a plurality of locations along a length of the borehole, and the method further comprises generating a wettability profile that indicates at least the wettability index at the plurality of locations.

9. The method of claim 1, wherein the method is performed in an uninvaded region of the formation.

10. An apparatus for estimating a wettability characteristic of a formation, the apparatus comprising:
    a magnetic resonance (MR) tool configured to be disposed in a borehole in the formation, the magnetic resonance tool configured to generate a low gradient static magnetic field and an oscillating magnetic field in a region of the formation and detect a MR signal generated in the region; and
    a processor configured to calculate relaxation parameters for at least one fluid in the region based on an assumption that the region is a single-wet region, the relaxation parameters including a first apparent $T_2$ distribution corresponding to a bulk relaxation distribution of the first fluid, and a second apparent $T_2$ distribution corresponding to a bulk relaxation distribution of the second fluid, and estimate the wettability characteristic of the region based on the relaxation parameters, wherein estimating the wettability characteristic includes determining whether the region is a single-wet region or a mixed-wet region based on comparing the calculated $T_2$ distribution to at least one of the first apparent $T_2$ distribution and the second apparent $T_2$ distribution.

11. The apparatus of claim 10, wherein the gradient of the low gradient magnetic field is non-zero and sufficiently low so that the $T_1$ distribution is at least substantially the same as the $T_2$ distribution.

12. The apparatus of claim 10, wherein the at least two fluids include oil and water.

13. The apparatus of claim 10, wherein the processor is configured to determine that the region is a single-wet region based on the first apparent $T_2$ distribution and the calculated first $T_2$ distribution being at least substantially the same.

14. The apparatus of claim 13, wherein the processor is configured to determine that the region is a mixed-wet region based on the first apparent $T_2$ distribution and the calculated first $T_2$ distribution being different, the mixed-wet region having a fraction of the second fluid that is in contact with pore surfaces in the region.

15. The apparatus of claim 14, wherein the processor is configured to calculate a wettability index based on the comparison between the first apparent $T_2$ distribution, the second apparent $T_2$ distribution and the calculated $T_2$ distribution.

16. The apparatus of claim 15, wherein the wettability index indicates a ratio of a first fluid surface relaxivity to a second fluid surface relaxivity.

17. The apparatus of claim 15, wherein the wettability index is calculated at a plurality of locations along a length of the borehole, and the processor is configured to generate a wettability profile that indicates at least the wettability index at the plurality of locations.

18. The method of claim 10, wherein the wettability characteristic is calculated for an uninvaded region of the formation.

* * * * *